UNITED STATES PATENT OFFICE.

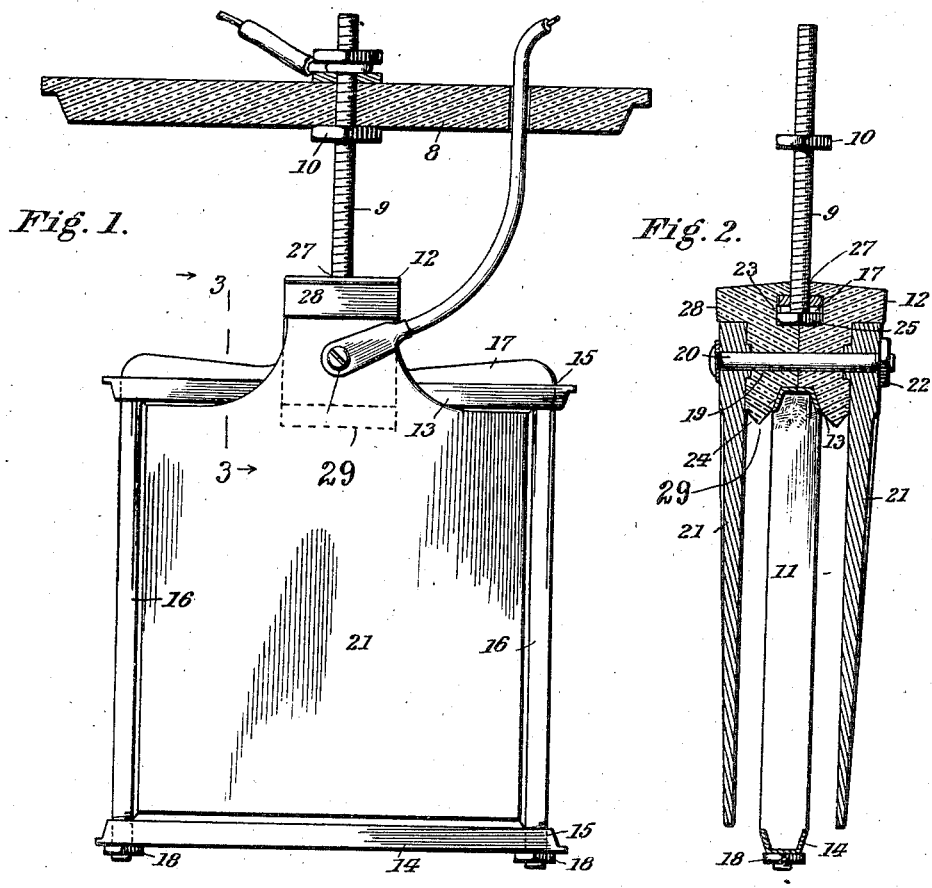
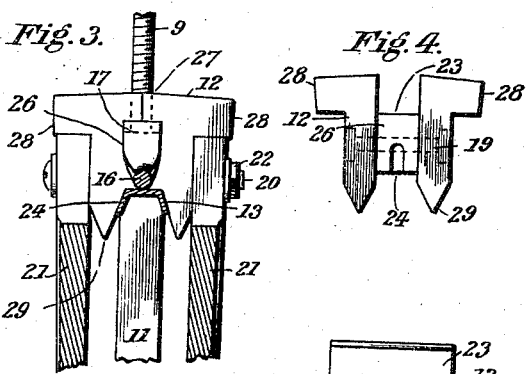
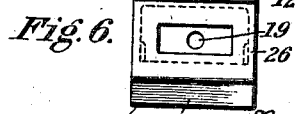

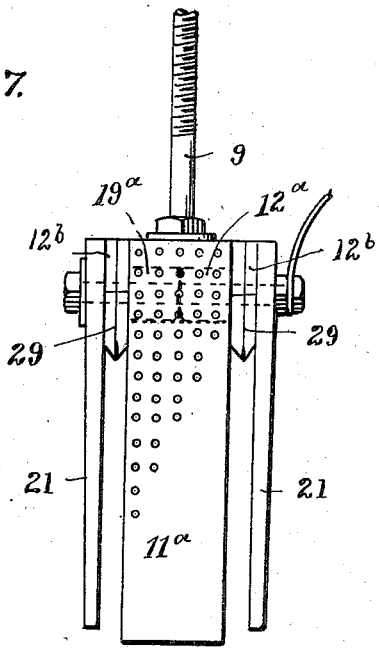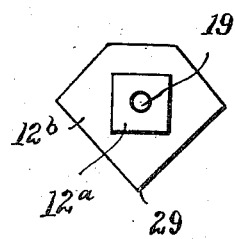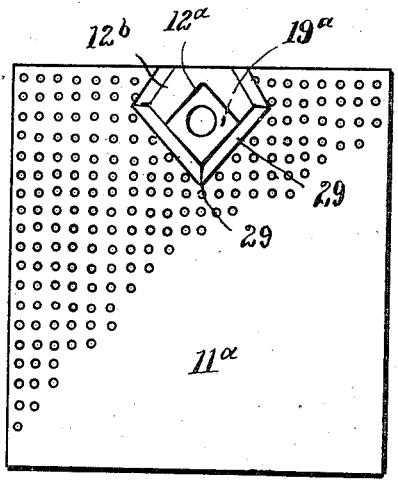

CHARLES B. SCHOENMEHL AND MARTIN L. MARTUS, OF WATERBURY, CONNECTICUT, ASSIGNORS TO THE WATERBURY BATTERY COMPANY, OF WATERBURY, CONNECTICUT, A CORPORATION OF CONNECTICUT.

PRIMARY BATTERY.

1,226,816.         Specification of Letters Patent.         Patented May 22, 1917.

Application filed May 15, 1916. Serial No. 97,461.

*To all whom it may concern:*

Be it known that we, CHARLES B. SCHOENMEHL and MARTIN L. MARTUS, citizens of the United States, and residents of Waterbury, in the county of New Haven and State of Connecticut, have invented certain new and useful Improvements in Primary Batteries, of which the following is a specification.

This invention refers to primary batteries, and belongs to that class of batteries which include flat forms of electrodes, as for instance plates made from compressed oxid of copper scale, or flat forms of receptacles in which a depolarizer is placed, as the negative electrode, and zinc plates as the positive electrodes.

Heretofore in batteries of this type, it has been possible for the upper edge portions of the opposing electrodes to become electrically connected by reason of the metal deposit from the electrodes settling upon the top of the insulating block and covering the same in a way to form a bridge between the electrodes, thus resulting in the destruction of the utility of the battery. The same form of assembled elements,—also frequently bridge across upon the under side of the insulating block when the under surfaces of such blocks are flat. This is brought about by reason of the fact that the solution of the battery becomes coated with a metallic substance and that when the element is removed and then again submerged it catches this skin of metal under the blocks and holds it there forming a short circuit between the electrode.

The purpose of the invention therefore is to provide an improved form of insulating block whereby the two said electrodes may be insulatively secured together and suspended from a single suspending rod, and particularly to design said block so as to prevent any possibility of the two electrodes becoming short circuited as for instance by reason of deposits forming upon either the top, bottom or edge portions of the insulators.

Similar characters of reference will be found to denote like or corresponding parts upon the several figures of the accompanying drawings forming a part of this specification and upon which, Figure 1 shows a side elevation of an assembled plate form of battery element suspended from a battery jar cover and including our improved form of insulating block.

Fig. 2 is a central vertical cross sectional view of the construction shown in Fig. 1.

Fig. 3 is a sectional elevation taken on line 3—3 of Fig. 1.

Fig. 5 is a detail sectional elevation showing a slightly modified form of insulating block.

Figs. 4 and 6 show edge and side views respectively of the insulating block shown in Fig. 5 which as will be noted is formed in one piece.

Fig. 7 shows an edge view of a modified form of assembled battery element including a relatively flat form of basket or container in which oxid of copper is used as the negative electrode instead of the compressed plate.

Fig. 8 shows a detached side view of the flat container and modified form of insulation shown in Fig. 7 and Fig. 9 shows a side elevation of a further modified form of insulating block detached from the electrode.

In Figs. 1 to 3 inclusive we have shown an insulating block made in two parts, while in Figs. 3 to 6 inclusive is shown a somewhat similar block formed in one piece and in Figs. 7 and 9 we have shown still other forms of insulators which are also made in two parts, one being better adapted for one form of frame construction, while the others are better adapted for the others. The frame construction for our elements therefore is not material, except so far as we preferably employ a single suspending rod for handing the suspended elements from a battery jar cover, as is suggested by the illustrations shown in Figs. 1, 2 and 3.

Referring in detail to the characters of reference marked upon Figs. 1 to 6 inclusive, of the drawings, 8 represents the battery jar cover and 9 a suspending rod which may be connected to the cover by means of clamping nuts 10. 11 represents the negative electrode which is arranged centrally beneath the insulating block 12 and as before suggested is in the form of a compressed oxid plate. This plate electrode is supported between an upper channel strip 13 and a lower channel 14 both of which are provided with holes 15 through their outer end portions and through which the side members 16—16 of the wire frame 17 passes. Nuts 18 which are attached to the threaded end portions of these side wire frame members serve to secure the bottom plate against the electrode and in turn the electrode against the top channel. The top cross portion of the wire frame may be flattened as shown in the drawings and also bent to engage the sides and top of the central portion of the insulating block.

A hole 19 is formed through the insulating block to accommodate the bolt 20 which serves to secure the side or zinc plates 21 of tapering cross section to the said insulating block through the assistance of the nut 22 attached to the end of the said bolt. The insulation may be made in either one or two or more parts and of either of the forms shown in the drawings. When the insulation is formed in two parts as shown in Figs. 1 to 3 and 7 and 8 inclusive, the bolt 20 also serves to hold the two members of the insulation together as will be apparent from Fig. 2.

The insulating block may further include a groove 24 in its underside to receive the top channel 13 and the edge of the negative electrode, and also an elongated pocket 23 in the top side to receive the vertical and cross portions of the loop and the head 25 and nut of the suspending rod. The side members of the loop are pocketed in side recesses 26 of the block thus bringing the several parts of the frame and rod attachment below the surface of the block. These features of construction are substantially similar in both forms of block, except that the top pocket, as shown in Figs. 4 and 5 is left open, while it is shown closed in Fig. 2 with the exception of a hole 27 through which the suspending rod 9 extends. The insulation has its under edge portions tapered and these are preferably made longest through their central portions forming an extended V-shaped edge portion 29 that serves to separate any metallic films that may be floating on the solution and better prevent internal short circuiting of the battery.

The essential features of the insulating block are not alone in its novel form of construction for covering the edge portions of the opposing electrodes at their point of attachment to the block, but also in the feature of construction above referred to which forms a drip for the solution when the elements are removed from the battery jar and thus avoid the formation on the insulation of a metallic covering. The extension or overhang designated as 28 also serves as a shoulder against which the upper edge of the zinc plate is seated thereby forming a further means of preventing the said plates from turning upon their attaching bolt.

In the construction shown in Figs. 7 and 8 the negative electrode is in the form of a perforated basket 11$^a$ in which the depolarizer is placed. A square hole 19$^a$ is formed through this basket and in it is fitted the square extensions 12$^a$ of the insulating blocks 12$^b$. These blocks are provided with holes to accommodate the clamping bolt that holds the elements together. The V shaped edge 29 of these blocks extends up the sides and lower corner of the block is arranged central upon the underside in a way to form a single central depending point.

We do not desire to be restricted to the direction in which the depending V portion of the insulator extends as we have ascertained that it is equally practical to use it with the V portion at right angles to the electrodes, as shown in Fig. 9. This form of block also serves to separate or part any metallic or conducting film which may be floating on the battery solution when immersing the elements into the solution, thereby eliminating danger of internal short circuits from this source.

Having thus described our invention what we claim and desire to secure by Letters Patent is:

1. In an assembled element form of primary battery, the combination with a hanger, of an insulating block carried thereby and having oppositely disposed flange portions, and plate electrodes attached to and supported beneath said flanged portions of the side of the block.

2. In an assembled element plate form of primary battery, the combination with plate forms of electrodes, of an insulating block arranged between and covering the edge portions of the plate electrodes at their point of attachment to the block.

3. In a flat form of primary battery, the combination of a frame, a flat form of electrode carried by the frame, an insulating block arranged between the flat electrode and having outwardly extended portions to cover the connected edge portions of said flat electrodes, and means for securing the electrodes to the said block.

4. In an assembled element form of primary battery, the combination of a hanger, a single suspending rod for the same, flat forms of positive and negative electrodes carried by the hanger, an insulating block arranged between the positive and negative electrodes and covering the edge portion of each of the plate electrodes at their point of attachment to the block.

5. In an assembled element form of primary battery, the combination of a hanger, a single suspending rod for the same, flat forms of positive and negative electrodes carried by the hanger, an insulating block arranged between the positive and negative electrodes and having a depending V shaped edge upon its under side.

6. In an assembled element form of primary battery, the combination with a hanger a single suspending rod for the same, flat forms of positive and negative electrodes carried by the hanger, insulating blocks arranged between the positive and negative electrodes and having a depending tapered edge upon its under side.

7. In an assembled electrode form of primary battery, the combination with a hanger, and a single suspending rod for the same, of flat forms of positive and negative electrodes carried by the hanger, insulating blocks arranged between the positive and negative electrodes and having extended V shaped side and bottom edge portions.

8. In an assembled element form of primary battery, the combination of a hanger and suspending rod for the same, of a flat form of positive electrode or container, an insulating block attached to each side of the said electrode, and having a central portion that is broader than its two side portions, and a negative electrode plate secured to the outer side of each of the said insulating blocks.

9. An insulating block for assembled primary battery elements, adapted to have electrodes attached thereto and having outwardly extended portions that cover the top edge of the plate electrodes when attached to the opposite side of the block.

10. In an assembled element form of primary battery, the combination of a hanger and suspending rod for the same, of a flat form of positive electrode or container, an insulating block attached to each side of the said electrode, and having a central portion that is broader than its two side portions and a negative electrode plate secured to the outer side of each of the said insulating blocks.

Signed at Waterbury, in the county of New Haven and State of Connecticut, this eighth day of May A. D., 1916.

CHARLES B. SCHOENMEHL.
MARTIN L. MARTUS.

Witnesses:
RUTH E. SCHOENMEHL,
HARRY T. HUBERT.